(No Model.)
J. JOHNSON & W. PENCE.
CHURN.
2 Sheets—Sheet 1.
No. 555,007.
Patented Feb. 18, 1896.
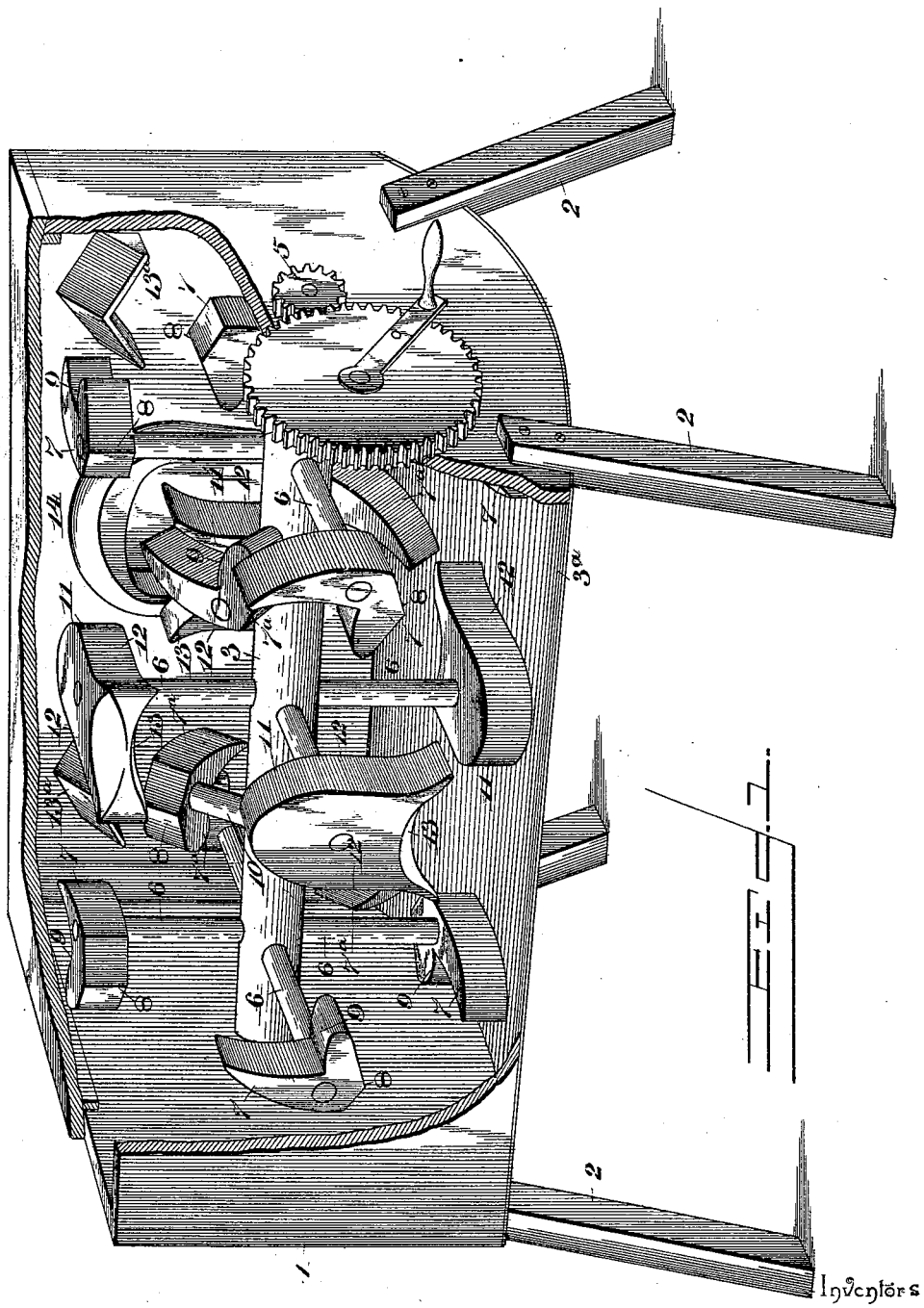
Witnesses
Inventors
Jabez Johnson and
William Pence.
By their Attorneys
C. A. Snow & Co.

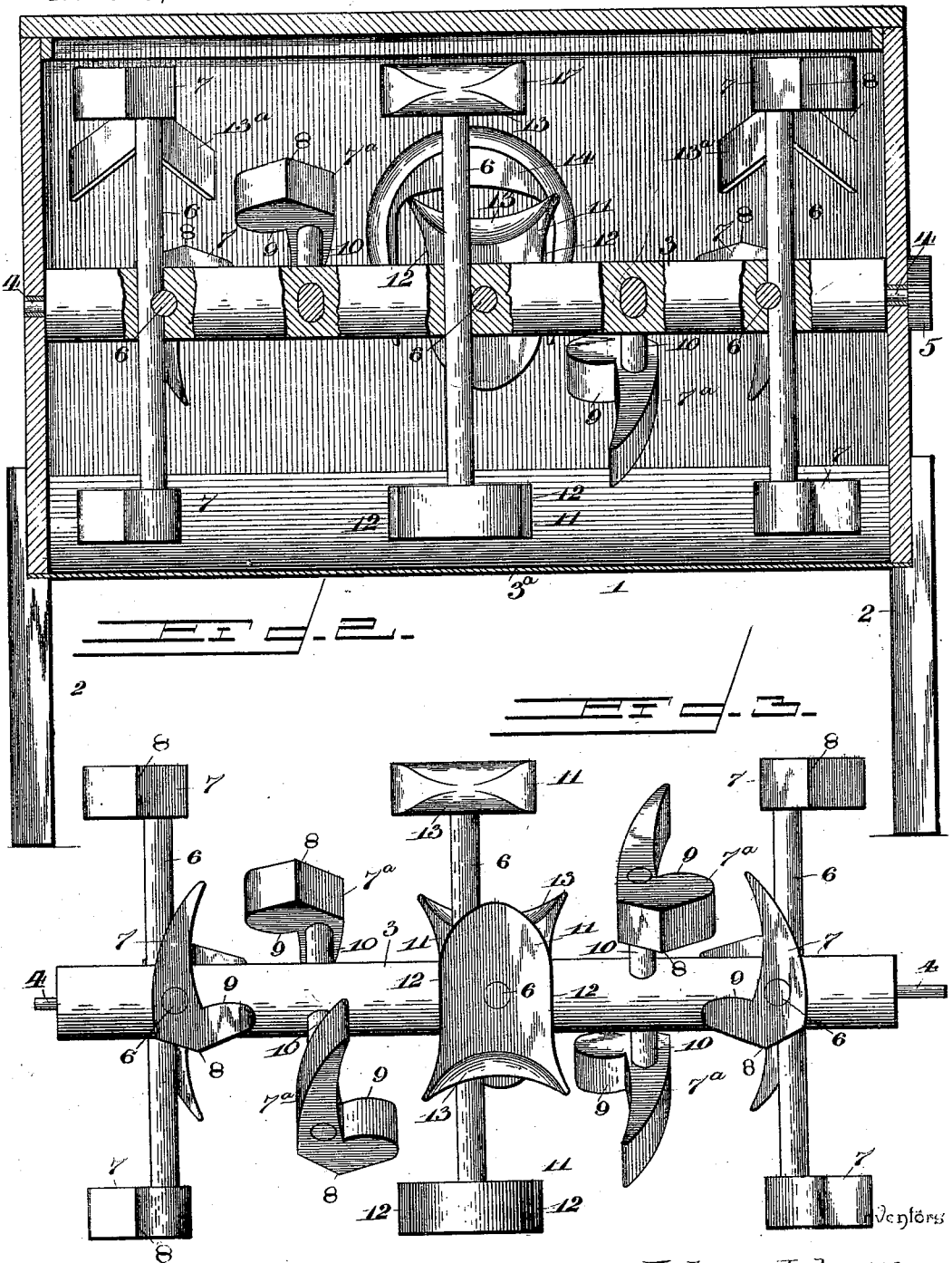

UNITED STATES PATENT OFFICE.

JABEZ JOHNSON AND WILLIAM PENCE, OF ALDERSON, WEST VIRGINIA.

CHURN.

SPECIFICATION forming part of Letters Patent No. 555,007, dated February 18, 1896.

Application filed March 30, 1895. Serial No. 543,871. (No model.)

*To all whom it may concern:*

Be it known that we, JABEZ JOHNSON and WILLIAM PENCE, citizens of the United States, residing at Alderson, in the county of Monroe and State of West Virginia, have invented a new and useful Churn, of which the following is a specification.

This invention relates to churns, and it has for its object to effect certain improvements in that class of churns employing revolving dashers, whereby novel and efficient means shall be provided for floating, stirring and breaking the cream and also for gathering the butter.

To this end the main and primary object of the present invention is to provide a peculiar construction of revolving dasher to secure the several results referred to.

With these and other objects in view, which will readily appear as the nature of the invention is better understood, the same consists in the novel construction, combination and arrangement of parts hereinafter more fully described, illustrated and claimed.

In the drawings, Figure 1 is a perspective view, partly in section, of a churn constructed in accordance with this invention. Fig. 2 is central vertical longitudinal sectional view thereof. Fig. 3 is a plan view of the revolving dasher.

Referring to the accompanying drawings, 1 designates the churn box or body mounted on suitable supporting-legs 2, and preferably provided with a curved bottom 3ª, and mounted for rotation within the churn box or body 1 is a horizontal dasher-shaft 3. The horizontal dasher-shaft 3 is arranged centrally and longitudinally within the box or body 1, and is suitably journaled at its ends, as at 4. In the opposite ends of said churn box or body, and to one end of the shaft 3, is preferably connected the operating-gearing 5, that provides convenient means for rapidly rotating the shaft 3 to secure the necessary churning action.

At the center and near the opposite ends of the revolving dasher-shaft 3 are arranged separate sets of radially-extending dasher-arms 6, each set of dasher-arms consisting of a pair of such arms suitably fitted in the shaft and disposed at right angles to each other, the opposite extremities of each dasher-arm of each set being located at diametrically-opposite sides of the dasher-shaft.

The radially-extending dasher-arms 6 of the end sets of such arms have fitted on their opposite extremities the segmental dasher-heads 7. The segmental dasher-heads 7 preferably consist of suitable sized solid blocks of wood that are provided at one end with the double-beveled or V-shaped portions 8, which are designed to enter the cream as the shaft is rotated in a direction for churning, and by reason of such double beveled or V shape at one end the segmental dasher-heads will easily enter the cream with but a small expenditure of power, while at the same time serving to thoroughly stir up and break the cream to provide for a quick churning thereof and the consequent production of butter in a very short time. By reason of the somewhat segmental shape of the dasher-heads 7 and the double-beveled or V-shaped portions at one end the said dasher-heads are provided at one side and in rear of the V-shaped ends with the L-shaped cup portions 9, which cup portions serve to gather up and collect the butter into balls when the dasher-shaft is slowly rotated in a reverse direction to the direction in which it is rotated for churning.

The segmentally-shaped dasher-heads 7, that are fitted on the end sets of the dasher-arms 6, are arranged with their L-shaped cup portions alternately disposed toward opposite ends of the churn box or body, whereby each succeeding dasher-head will have the L-shaped cup portion thereof disposed in an opposite direction to the L-shaped cup portion of the preceding dasher-head, and this arrangement of the dasher-heads 7 disposes the dasher-heads carried by one of the arms 6 of each set partly out of the circular path of the dasher-heads carried by the other of said arms to insure a thorough agitation of the cream, while at the same time providing for bringing each of the dasher-heads 7 into play for gathering the butter when the direction of rotation of the shaft 3 is reversed.

Intermediate of the end sets of dasher-arms 6 and the central set of such dasher-arms are arranged the short single dasher-arms 10, that are fitted in the shaft 3, so as to dispose the extremities of said short arms at diametrically-opposite sides of the shaft, and on the opposite extremities of the short intermediate dasher-arms 10 are fitted the segmental dasher-heads 7ª, which are identical in construction to the dasher-heads 7, already described. The segmental dasher-heads 7ª are necessarily disposed nearer to the shaft 3 than the dasher-heads 7, owing to the short length of the dasher-arms 10, and the said heads 7ª that are fitted on the ends of the arms 10 are reversely disposed to each other with respect to the disposition of their L-shaped cup portions to provide for the same action as the dasher-heads 7. At this point it is to be noted that the disposition of the dasher-heads 7ª, near to the dasher-shaft 3, provides for floating the cream away from the dasher-shaft and out toward the outer sets of dasher-heads 7 to insure a thorough agitation and breaking of the cream, which operation is repeated continuously during the rotation of the dasher-shaft until the cream is completely churned, which usually takes but a short time. The extremities of the dasher-arms of the central set of such arms have fitted thereon the centrally-located solid U-shaped dasher-heads 11. The centrally-located U-shaped dasher-heads 11, by reason of their U shape, are provided with the opposite sigmoidal-shaped sides 12, which, when the dasher-shaft is rotated to provide for gathering the butter, tend to throw the butter away from the vertical center of the churn-box and toward the outer and inner sets of segmental dasher-heads which collect the butter. Opposite their rounded ends the U-shaped dasher-heads are provided with the curved double-beveled front ends 13, which are forced through the cream when the dasher is rotated for churning to assist in the churning operation, and it will be noted that the dasher-heads 11, carried by one of the dasher-arms of the central set, travel partly out of the circular path of the dasher-heads carried by the other of said arms.

The thorough breaking of the cream that is agitated by the end sets of dasher-heads 7 is insured by means of the stationary end breakers 13ª. The stationary end breakers 13ª are of an inverted-V shape and are suitably secured to one inner side of the churn box or body 1, directly at one side of the end set of dasher-arms 6, so that when the dasher is rotated for churning the dasher-heads 7 will throw the cream against and into the pockets of the breakers 13ª. The same result is secured in connection with the central group of U-shaped dasher-heads 11 by means of a central inverted-U-shaped stationary breaker 14, that is fastened to the same side of the box 1 as the breakers 13ª, and which is disposed directly at one side of the central set or group of the dasher-arms 6.

From the above it is thought that the construction and operation of the herein-described churn will be readily apparent to those skilled in the art, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a churn, a horizontally-revolving dasher comprising a horizontal shaft, separate sets of radial dasher-arms fitted to the shaft at the center and near its opposite ends, short dasher-arms fitted to the shaft intermediate of the central and end sets of dasher-arms, segmental-shaped dasher-heads fitted on the extremities of the end sets of dasher-arms and intermediate short dasher-arms, said segmental dasher-heads being provided with V-shaped front ends, and L-shaped butter-collecting cup portions at one side and in rear of said V-shaped front ends, and U-shaped solid dasher-heads fitted on the central set of dasher-arms and provided with opposite sigmoidal-shaped sides 12, and curved double-beveled front ends 13, substantially as set forth.

2. A churn-dasher comprising a horizontal shaft, radially-disposed dasher-arms fitted to the shaft, and segmental dasher-heads fitted on the extremities of the dasher-arms and provided with V-shaped front ends, and L-shaped cup portions at one side and in rear of said V-shaped front ends, the said L-shaped cup portions serving to collect the butter when the dasher is rotated in a reverse direction to the churning motion, substantially as set forth.

In testimony that we claim the foregoing as our own we have hereto affixed our signatures in the presence of two witnesses.

JABEZ JOHNSON.
WM. PENCE.

Witnesses:
W. C. POLLOCK,
EDWIN MANN.